United States Patent Office 3,575,908
Patented Apr. 20, 1971

3,575,908
USE OF ASPHALTENES TO INCREASE THE IMPACT RESISTANCE OF POLYETHYLENE TEREPHTHALATE
Robert J. Bathgate, Media, Pa., assignor to Sun Oil Company, Philadelphia, Pa.
No Drawing. Filed Sept. 12, 1968, Ser. No. 759,513
Int. Cl. C08h 13/08
U.S. Cl. 260—28  4 Claims

ABSTRACT OF THE DISCLOSURE

A new composition having superior physical properties which consists of polyethylene terephthalate and up to 12% by weight asphaltene.

---

This invention relates to novel compositions of polyethylene terephthalate and more particularly to compositions of polyethylene terephthalate and asphaltene having superior physical properties.

Polyethylene terephthalate is a polyester resin which is generally formed from ethylene glycol and terephthalic acid. The resin has a melting point of approximately 265° C. and a second order transition temperature of 70° to 80° C. It is commercially employed as either oriented films or fibers characterized by high strength, good electrical properties, and high resistance to moisture, and is the basis for such well-known commercial products as Dacron, Mylar, and Cronar, all trademark products of E. I. du Pont de Nemours and Company. Due to its desirable diversified properties, polyethylene terephthalate has been used as electrical insulation, decorative laminations, vapor barrier material, wearing apparel, and household fabrics among others.

One limiting property of the compound is the various degrees of crystallinity which the resin possesses in its solid state as a function of its thermal history. When a melt is quenched rapidly, the mass formed is transparent and almost completely amorphous. The polymer molecules are "quick frozen" in the position they held upon passage into the solid state, and no crystallization can take place. (Bjorksten Research Laboratories, Inc.: "Polyesters and Their Applications," Reinhold Publishing Corp., New York, 1956, pp. 207–208.) This phenomenon occurs when fibers are extruded from a melting tank or when the compound is employed for molding. As a result of this undesirable amorphous state, the resulting solid is brittle, causing a decrease in its impact strength and its elongation at break.

It is therefore an object of this invention to produce improved flexibility of polyethylene terephthalate compounds.

It is a further object of this invention to produce the improved flexibility of the polyethylene terephthalate compounds while at the same time maintaining its other desirable physical and chemical properties.

These and other objects of the invention will become more apparent as the invention hereinafter becomes more fully disclosed.

In accordance with the objects of the invention, it has now been discovered that by forming a blend of polyethylene terephthalate and up to 12% by weight asphaltene, preferably 4 to 6%, the flexibility of the polymer can be increased without a meaningful reduction in its strength properties. These novel compounds show improved properties of elongation at break and impact strength as indications of their increased flexibility.

Asphaltenes are the high molecular weight disperse phase of asphalts. They are organic materials and are defined by their solubility characteristics in certain arbitrarily selected solvents. The asphaltenes are insoluble in low-boiling saturated hydrocarbons such as petroleum naphtha, pentane, and hexane, but are soluble in carbon tetrachloride and carbon disulfide. These solubility characteristics are the basis of the separation of asphaltenes as a distinct phase. They are usually separated from the solvent in the form of a coarse brown-black powder having essentially no cohesiveness. The yield and properties of an asphaltene depend upon the asphalt source, the kind and amount of solvent used for separation, and the separation conditions. Asphaltenes have a high carbon-to-hydrogen atomic ratio and contain varying amounts of oxygen, sulfur, and nitrogen. A high carbon-to-hydrogen ratio indicates a strongly aromatic nature. For example, the value of saturated hydrocarbons is about 0.5; for benzene, about 1.0; and for naphthalene, about 1.25. The carbon-to-hydrogen ratio of asphaltenes derived from some typical sources is as follows:

| Origin: | C:H ratio of asphaltenes (Naptha precipitation) |
|---|---|
| Residual bitumens | .85–.91 |
| Blown bitumens | .82–.88 |
| Highly cracked material | 1.25 |
| Trinidad asphalt | .79 |
| Gilsonite | .71 |

Asphaltenes are believed to have a molecular weight of from about 2,000 to about 10,000. The actual molecular configuration of asphaltenes is not known. Some observers suggest a configuration involving large fused rings, and others suggest smaller fused rings joined by and bearing aliphatic chains. (Pfeiffer: "The Properties of Asphaltic Bitumen," Elsevier, 1950.)

The source of the asphaltenes is not critical. Any bitumen, asphalt, or crude residuum containing asphaltenes is suitable. The two principal sources are native asphalts and asphalts resulting from petroleum refining operations. Asphalt from petroleum refining operations like deasphalting of crude oils will usually require further solvent treatment to separate or further concentrate the asphaltenes. Air blown and other chemically treated asphalts can be used. It is not necessary that the asphaltene concentration of the starting material be 100%. However, a concentration of at least 80 wt. percent asphaltenes in the asphaltene concentrate is required to obtain products with the desired properties. The preferred concentration of asphaltenes is 90 to 100% by weight. Solvents such as petroleum naphtha, pentane, hexane, cyclohexane, and diethylether can be used to concentrate the asphaltenes.

The softening point of the original asphaltene material can be from about 300° to 600° F., preferably 425° to 550° F., and it is 95 to 99% soluble in $CS_2$. These properties depend on the conditions of the method of concentrations, e.g., solvent, severity, and number of stages. Preferably, the asphaltene contains less than 8% by weight sulfur.

The polyethylene terephthalate can be prepared by any method well known in the art. Such methods are fully disclosed in Encyclopedia of Chemical Technology, Kirk and Othmer, 1st ed., vol. 13, pp. 844–845.

As a general operating procedure, the asphaltene and polyethylene terephthalate in their desired portions are first dry blended together and then extruded at approximately 500° F. The extruding may be carried out several times, if desired. Subsequently, the blend is injection molded. The process can be carried out either batchwise or continuously, and any apparatus well known in the art is employable.

As a specific but nonlimiting example of the instant invention, an asphaltene was precipitated from a vacuum-distilled residuum by hexane solubilization of the accompanying low molecular weight materials. Feed to the vacuum tower consisted of a mixture of 40 wt. percent Lagomedio reduced crude and 60 wt. percent Sweden crude. The isolated fraction was then repulped with hexane and subsequently centrifuged, giving an asphaltene fraction containing approximately 9.1 wt. percent pentane solubles and a Fisher Johns softening point of 430° F. The fraction was then subjected to a pentane Soxhlet extraction which changed the softening point from 430° F. to 522° F. and dropped the pentane solubles to about 1.1 wt. percent. The fraction had the following chemical composition:

| | Weight percent |
|---|---|
| Carbon | 83.61 |
| Hydrogen | 7.20 |
| Oxygen | 3.31 |
| Sulfur | 4.62 |
| Nitrogen | 1.82 |

The asphaltene was then dry blended with Polyethylene Terephthalate Fiber Flake, containing minor amounts of TiO$_2$, a product of E. I. du Pont de Nemours and Company, in concentrations from zero to 10 wt. percent, extruded twice at about 530° F., and subsequently injection molded at 540° to 550° F. Mold temperatures for this step were 70° to 130° F. The samples were thoroughly dried between processing steps. The blends were then evaluated for their physical properties, and the results are shown in Table I. Evaluation of the pure polymer is also shown in Table I. As aforementioned, the determination of elongation at break and Izod impact strength are the prime indications of the flexibility of the compound; and as can be seen by the data, substantial improvements are obtained with the asphaltene blend. It should also be noted that the water absorption of the polymer was also lowered with the asphaltene present.

TABLE I.—PHYSICAL PROPERTIES OF POLYETHYLENE TEREPHTHALATE-ASPHALTENE BLENDS

| Property | Asphaltene content, wt 1 percent | | | |
|---|---|---|---|---|
| | 0 | | 5 | 10 |
| | No extrusions | 2 extrusions | 2 extrusions | |
| Elongation at break, percent | 4.2 | 3.0 | 35.0 | 8.9 |
| Izod impact strength, in.-lbs./in. | 1.9 | 2.9 | 4.5 | 3.4 |
| Yield strength, p.s.i. | 9,770 | 7,900 | 7,640 | 7,190 |
| Elongation at yield, percent | 4.0 | 3.7 | 3.7 | 3.3 |
| Tensile modulus p.s.i.×10$^{-5}$ | 3.66 | 3.25 | 3.21 | 3.13 |
| Area under tensile curve to ductile failure, in.$^2$/in.$^2$×10$^{-2}$ | 4.41 | 2.48 | 3.21 | 2.70 |
| Flexural modulus, p.s.i.×10$^{-5}$ | 3.33 | 3.11 | 3.13 | 3.02 |
| Water Absorption, wt. percent 24 hrs. at 73° F | 0.15 | 0.14 | 0.10 | 0.06 |

Although it is not fully understood why these superior properties are obtained at these concentrations, it is believed that the asphaltene is being located at random positions throughout the polymer and adding flexibility thereto, rather than increasing the crystallinity of the polyethylene terephthalate. This belief is based on X-ray techniques which show that there has been no increase in crystallinity upon the incorporation of the asphaltene, and further upon the disclosure in U.S. Patent 2,775,549 which states that not only do asphaltenes generally not orient under specified conditions, but also have been shown to interfere with the orientation of other molecules. It should be noted that the above is not intended to be an accurate explanation of the surprising results obtained. It is a fact, however, that when the proportions fall within the limits given, the abnormal characteristics of the product and the marked improvement in properties are obtained.

As can readily be appreciated by one skilled in the art, while the particular compositions and methods described herein are well adapted to meet the objects of the present invention, various modifications or changes may be resorted to without departing from the scope of the invention as defined in the claims.

I claim:
1. A composition consisting of polyethylene terephthalate in an amount from about 4 and up to 12% by weight asphaltene.
2. A composition as described in claim 1 which consists of about 4 to 6% by weight asphaltene.
3. A process for improving the flexibility of molded polyethylene terephthalate which comprises blending asphaltene with polyethylene terephthalate in an amount from about 4 up to 12% by weight, extruding the composition to ensure thorough dispersion and aftereafter molding the blend at a temperature between 70 and 130° F.
4. A process as in claim 3 where the amount of asphaltene is 4 to 6%.

References Cited

UNITED STATES PATENTS 3,419,460  3/1968  Ure _____ 260—40

OTHER REFERENCES

Doyle, F. J., "A Study of the Effect of Asphaltenes on the Mechanical Properties of Thermoplastics," June 1966, p. I–IV and 1, 2, 76, 77 and FIG. 1 and 2.

MORRIS LIEBMAN, Primary Examiner

T. MORRIS, Assistant Examiner